United States Patent Office 2,894,113
Patented July 7, 1959

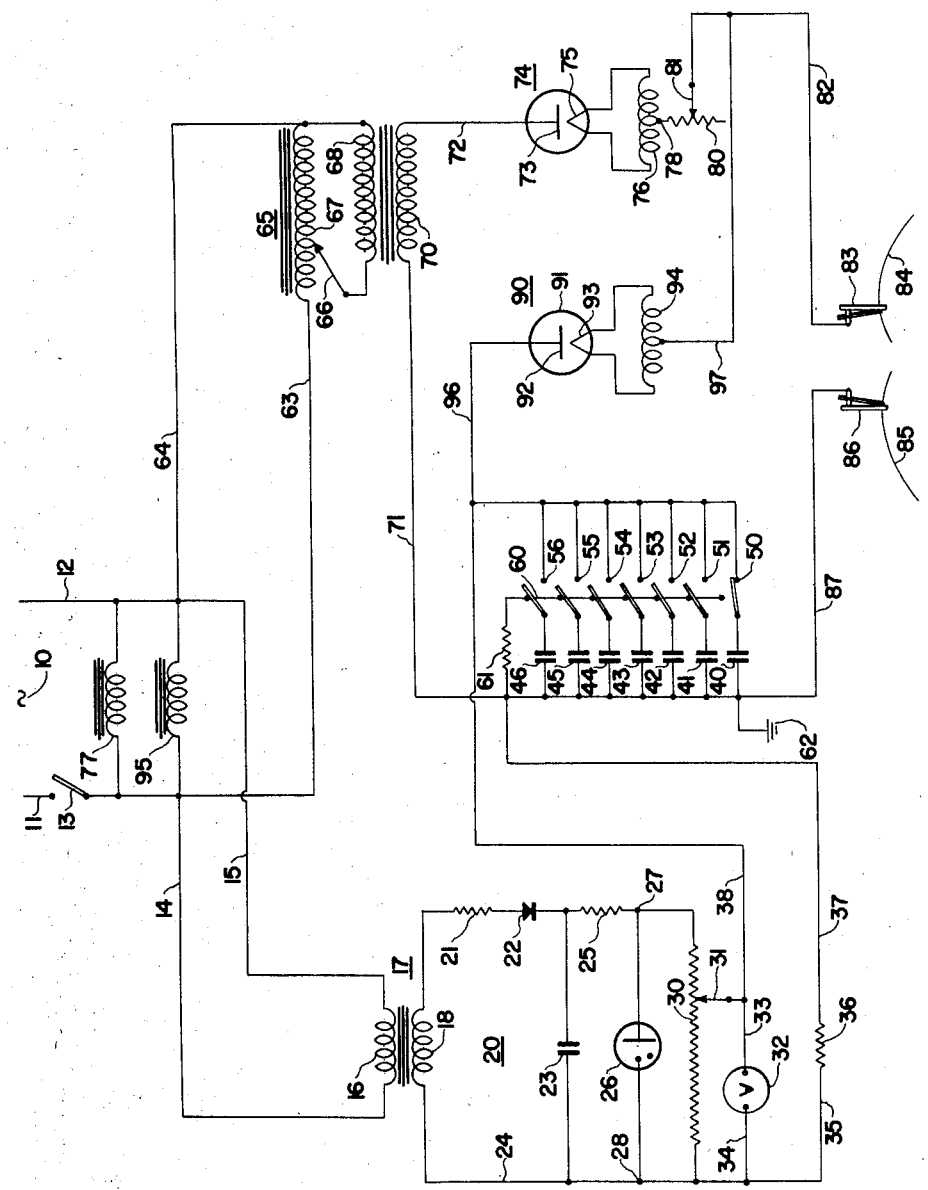

2,894,113

WELDING METHOD AND DEVICE

William M. Wakeley, Milwaukee, Wis., assignor to Minneapolis-Honeywell Regulator Company, Minneapolis, Minn., a corporation of Delaware Application March 13, 1957, Serial No. 645,823

5 Claims. (Cl. 219—96)

The present disclosure is directed to a method and device for welding wires, and more particularly is directed to the alignment of and welding of exceedingly fine wires.

In the art of preparing wire wound potentiometers it has become necessary to build potentiometers having varying resistance characteristics. This type of potentiometer is commonly referred to as a characterized potentiometer. One of the most convenient methods of preparing this type of device is by winding a wire of a fixed diameter for a definite number of turns with a fixed spacing and then connecting thereto a second wire having a different diameter or characteristic for the subsequent section of the potentiometer winding. The use of two or more wires has become common in the characterized potentiometer field and a method of joining the ends of these wires has been a major problem in their preparation. The most desirable type of joint is a butt weld of the two ends of the wires involved. Butt welding two wires of relatively large size and high rigidity is simple by conventional welding methods, but in the presently wound characterized potentiometers wire sizes in the order of $9/10,000$ of an inch in diameter or less are in use. It can be understood that wires in the order of $9/10,000$ of an inch in diameter are exceedingly difficult to handle and have been in the past substantially impossible to weld by conventional welding processes.

In butt welding two wires in the order of $9/10,000$ of an inch two major problems exist. The first problem is an alignment of the wires and the second is the affecting of a weld. It can be readily understood that wires of this size are very difficult to handle and normally require visual magnifying devices and highly skilled technique. Normally wires of this size are not welded but are joined by overlapping the wire ends and joining the overlapped ends by means of solder or a liquid silver paint. These types of joints are usable but undesirable due to their lack of mechanical strength and physical size.

It is the object of the present invention to disclose a method whereby two or more small wires may be joined by a condenser discharge type of welding process.

It is a further object of the present invention to disclose a method whereby the fine wires are automatically aligned for a perfect butt weld.

Still another object of the present invention is to provide a unique welding device that provides the necessary alignment features for fine wires and also provides an inert atmosphere at the welding surfaces.

An additional object of the present invention is to disclose a method and device capable of aligning and butt welding wires of exceedingly small size and accomplishing this feat in a manner usable in commercial production facilities.

These and other objects of the present disclosure will become apparent when the following drawing disclosing a simplified schematic version of the welding equipment is considered with a description thereof and a description of the method of operating the unit.

The method of butt welding two or more wires will be described in detail before a description of the specific equipment used is undertaken. In describing the method used the simplest case will be described and it will become obvious that the method described could be applied in numerous ways. Two fine wires to be joined by butt welding are inserted into two electrically insulated and physically separate clamping members. A low potential direct current source is connected between the two spaced clamp members. This low potential current source can be in the nature of a charged capacitance bank. In addition to the low voltage potential source applied across the clips there is applied a high voltage direct current potential source having a low current capacity. The two voltage sources are isolated from one another by means of an asymmetrically conducting device such as a dry rectifier or a high voltage vacuum tube rectifier. It is understood therefore that a potential is applied to the two wires to be welded which is in reality a composite arrangement of a low voltage having a high voltage superimposed thereon. The two wires to be butt welded are then brought into proximity with one another. The high voltage impressed across the wires establishes an electrostatic field between the tips of the two fine wires and this electrostatic field causes the tips of the wires to move to the shortest possible distance therebetween. The electrostatic field, by its inherent electrical properties, thereby aligns the two fine wires so that the shortest possible distance exists between the butt ends of each of the wires. The wires are then slowly brought together and the electrostaic field maintains an exact alignment between their ends. When the butt ends of the two wires are brought into very close proximity a high voltage discharge occurs between them creating an ozone atmosphere around the tips of the fine wires. The ozone atmopshere is maintained by the continuous discharge of the high voltage but it is understood that this high voltage discharge does not have the capabilities of welding the wire tips due to the length of the gap and the low current capacity of the high voltage source. As the wires are moved close to one another a weld is affected by the discharge of the low voltage, high current source.

It can therefore be seen that three basic steps occur in the butt welding of the two fine wires in the above described method. The first step is that of establishing a high voltage field between the tips of the wire to utilize the electrostatic field for aligning the butt ends. The second step is bringing the wires into proximity with one another so that the discharge of the high voltage source can create an ozone atmosphere which is inert and provides an ideal atmosphere for welding. And thirdly, the low voltage, high current source provides the necessary welding power to complete a perfect butt weld. Wires of exceedingly small size have been joined by the above described process and the butt weld resulting has good mechanical strength and exceedingly accurate alignment of the wires welded. Further, the characteristics or physical properties of the wires are not adversely affected near the weld. The method described is applicable to the welding of any type of and size of wires where the rigidity of the wires is low and an electrostatic field of high enough intensity can be created to overcome the gravitational effect on the ends of the wire.

A device capable of supplying the necessary high and low potentials for welding in the above described method is shown in a highly simplified form in the accompanying drawing. Many of the safety features and refinements contained in the actual welding equipment have been deleted from this drawing for simplicity's sake but it is understood that these additional features can be incorporated into a production device. In the drawing there is shown an alternating current supply 10, which is utilized by conductors 11 and 12. The switch 13 is utilized to interrupt the power to the device and is of any convenient design. By means of conductors 14 and 15 an alternating current from supply 10 is conducted to the primary 16 of a transformer 17. The transformer generally shown at 17 has a secondary winding 18 which acts as the high potential source of a direct current power supply generally shown at 20. The power supply 20 is of a conventional nature wherein a resistor 21 is connected in series with the secondary winding 18 and acts as a current limiting device in power supply 20. The resistor 21 is in series with a dry plate rectifier 22 which in turn is in series with a filter condenser 23. The filter condenser 23 is connected to the transformer secondary 18 by means of conductor 24. It is obvious that a direct current potential appears across the condenser 23 and that this voltage would have a ripple conventionally encountered in a half wave rectifier of the type shown. In an effort to reduce this ripple a resistor 25 and a gas voltage regulator tube 26 are placed across the condenser 23 and thereby a substantially constant direct current voltage appears at the junctions 27 and 28 of the voltage regulator tube 26. In order to selectively utilize the direct current voltage appearing across points 27 and 28 a bleeder resistor 30 is provided. The bleeder resistor 30 acts as a convenient means of obtaining a variable magnitude of direct current potential as will be shown below.

A slider 31 is provided to contact the bleeder resistor 30 and the slider 31 is connected to one side of a voltmeter 32 by means of a conductor 33. The opposite end of the voltmeter 32 is connected to one end of the bleeder resistor 30 by means of conductor 34. The voltmeter 32 indicates the amount of direct current voltage available upon moving slider 31 with respect to the bleeder resistor 30. The power supply described is then utilized to supply a low voltage of the power supply by means of conductor 35, current limiting resistor 36, conductor 37, and conductor 38. Conductors 37 and 38 are in turn connected across a bank of capacitors 40 through 46. This connection is accomplished by directly connecting one terminal of each of the capacitors 40 through 46 to conductor 37 and connecting conductor 38 to a common terminal of a plurality of switches 50 through 56. Each of the switches 50 through 56 is of a single pole double throw variety and as previously stated, conductor 38 connects to a common terminal of each of these switches. A second common pole of each of these switches is joined by a conductor 60 which in turn is connected to a safety bleeder resistor 61. The remaining terminal of each of the switches 50 through 56 is connected to the free end of each of the condensers 40 through 46. With the switching arrangement shown any one of the condensers 40 through 46 may be individually connected to conductor 38 or any group of these condensers may be connected thereto. It will be noted that when any one of the condensers 40 through 46 is not connected to conductor 38 by means of switches 50 through 56, that the free end of the condenser is connected to conductor 60. Conductor 60 allows a complete shunting path through the bleeder resistor 61 to discharge the capacitors not in use. As a further safety precaution conductor 37 is grounded at 62 so that one side of the low voltage from the power supply 20 is always fixed at the ground reference.

A second energizing circuit having conductors 63 and 64 connected to conductors 11 and 12 provides for the high voltage section of the device. Conductors 63 and 64 are in turn connected to opposite sides of an autotransformer 65. The autotransformer 65 is of the variable type and has the sliding tap 66 which rides on the primary winding 67 of the autotransformer 65. The winding 68 of the transformer 65 in turn energizes a secondary winding 70 which is utilized to supply a relatively high voltage. It will be noted that the voltage across the secondary winding 70 will vary depending upon the location of slider 66 on the primary winding 67. One side of the secondary winding 70 is connected by means of conductor 71 to conductor 37, which is in turn grounded at 62. The other side of the secondary winding 70 is connected by means of conductor 72 to the plate 73 of a high voltage rectifier 74. The combined cathode and heater element 75 of the rectifier 74 is energized by a conventional transformer secondary 76. The primary winding for the energization of the secondary winding 76 is directly connected across conductors 11 and 12 and is shown at 77. A center tap is provided at 78 of the secondary winding 76 and the center tap 78 is in turn connected to a potentiometer 80. The potentiometer 80 has a slider 81 which is used to establish a current limiting impedance for the high voltage supply. The slider 81 is connected to the conductor 82 which is in turn connected to a wire clamp 83 which holds the first wire 84 to be welded. The second wire to be welded is shown at 85 and is held firmly by a wire clamp 86. The wire clamp 86 is joined to the ground 62 by means of conductor 87. It is obvious that the secondary winding 70, rectifier 74, conductor 82, clamp 83, wires 84 and 85, clamp 86, conductors 87, and 71 form a complete high voltage circuit such that the voltage developed due to the transformer secondary winding 70 and the high voltage rectifier 74 are applied across the wires 84 and 85.

In order to connect the low voltage welding potential that is developed across conductors 37 and 38 to the clamps 83 and 86 which in turn hold wires 84 and 85, it becomes necessary to use an asymmetrically current conducting means generally shown at 90. This conducting means is shown as a high voltage rectifier tube 91 having a plate 92 and a common filament and cathode 93. Again the filament is energized from a transformer secondary 94 and an appropriate transformer primary 95 which is connected across conductors 11 and 12. The plate 92 of the tube 90 is connected by conductor 96 directly to conductor 38. By means of conductors 97, the transformer secondary 94 and thence the cathode 93 are connected to conductor 82 to form a complete circuit to the welding clamp 83.

It is understood that if switch 13 is closed and any one or all of the switches 50 through 56 are closed, that a low voltage charge will be placed on one or all of the appropriate condensers 40 through 46. By means of the rectifier 90 a discharge path is established for the condenser bank through conductors 97, 82, and the wires and clamps back to conductor 87 and thence to the opposite side of the capacitors. It is further understood that the high voltage rectifier 90 acts as a buffer between the high voltage rectifier 74 and the capacitor bank and thereby prevents a high voltage discharge therethrough. With the arrangement shown it is obvious that the dual potentials needed to properly operate the welding device have been provided and that complete flexibility in the magnitude of the voltage is available by the adjustable features disclosed.

As previously pointed out, the welding equipment disclosed is in a highly simplified form and it is understood that many modifications could be made in the unit. In the production devices being used, safety interlocks and control switches are appropriately placed in the device and these features can be added where suitable. Those versed in the art can readily see additional modifications in the method and device and the applicant in no way intends to be limited to the specific disclosure made but is limited only by the scope of the appended claims.

I claim as my invention:

1. In a method of welding articles having a low rigidity comprising the steps of: simultaneously impressing a first and a second electric source across said articles while they are in spaced relationship; moving the articles into proximity with one another; said first electric source being high enough to create an electrostatic field to align the articles to be welded; and the second electric source effecting the weld.

2. In a device of the class described adapted to weld a plurality of elements: a low voltage direct current source; asymmetrical current conducting means connected in series with said source and the elements; and a high voltage direct current source connected to the elements so that said asymmetrical current conducting means prevents a current from then flowing; said high voltage source creating an electrostatic field between the elements to align them when the elements are brought into proximity to one another; said low voltage source effecting a weld when the elements are brought together.

3. In a device of the class described adapted to weld a plurality of wires having a low rigidity: a low voltage direct current source; condenser means selectively connected to said source and thereby charged to said low voltage; asymmetrical current conducting means connected in series with said condenser means and the wires; and a high voltage direct current source connected to the wires so that said asymmetrical current conducting means prevents a current from then flowing; said high voltage source creating an electrostatic field between said wires to align them when the wires are brought into proximity to one another; said charge on said condenser means effecting a weld when the wires are brought together.

4. In a method of welding articles having a low rigidity comprising the steps of: simultaneously impressing a first and a second electric source across said articles while they are in spaced relationship; said first electric source being of high potential and low current capacity, and said second electrical source being of low potential and high current capacity; moving the articles into proximity with one another; said first electrical source being high enough to create an electrostatic field to align the articles to be welded; and the second electrical source effecting the weld.

5. In a method of welding articles of small cross section having a low rigidity comprising the steps of: simultaneously impressing a first and a second electric source across said articles while they are in spaced relationship; said first electric source being of high potential and low current capacity, and said second electrical source being of low potential and high current capacity; substantially aligning the articles to be welded; moving the articles into proximity with one another; said first electrical source being high enough to create an electrostatic field to align the articles to be welded; and the second electrical source effecting the weld.

References Cited in the file of this patent

UNITED STATES PATENTS

| | | |
|---|---|---|
| 1,373,054 | Chubb | Mar. 29, 1921 |
| 2,710,328 | Semple | June 7, 1955 |
| 2,797,302 | Smith | June 25, 1957 |